UNITED STATES PATENT OFFICE.

JAMES COLE, OF DIXON, KENTUCKY.

MODE OF DESTROYING INSECTS.

SPECIFICATION forming part of Letters Patent No. 277,008, dated May 8, 1883.

Application filed March 13, 1883. (No specimens.)

*To all whom it may concern:*

Be it known that I, JAMES COLE, a citizen of the United States, residing at Dixon, in the county of Webster and State of Kentucky, have invented a new and useful Mode of Destroying Insects; and I do declare the following to be a full, clear, and exact description of the invention.

This invention relates to an improved method of destroying and preventing animal life in the form of worms, bugs, and other insects such as inhabit plants and live and feed upon vegetable products, particularly the cabbage and tobacco plant and potato-vines.

It is well-known to the agricultural world that worms and bugs of a certain genus infest and make their diet upon some of the most useful and valuable of domestic vegetables and plants, causing great destruction and loss, and frequently wholly consuming and exterminating crops, and it is to provide for preventing such destruction that my invention is designed.

The said invention consists in using an extract made from the leaves and stems of the elder-plant, botanically denominated "*Sambucus*."

The following is the manner in which it is prepared, to wit: I first place a vessel containing water over a suitable fire or other heating agent, and into this water a quantity of the leaves and stems of the plant above referred to—namely, elder, (*Sambucus*)—is put. The water is then brought to boiling-point and kept at this degree of heat until the same becomes strongly impregnated with the juice of the plant, which in this manner is drawn or extracted from the leaves and stems, and taken up and mixed with the water. When the mass has been subjected to the boiling process a sufficient length of time, which depends somewhat upon the intensity of the fire, to become slightly thickened or to have reached the consistence of cream, the liquid portion is poured or drawn off and put into a suitable vessel. After cooling it is ready for use, and the manner of applying it consists of sprinkling a small quantity over the plant or vine which is attacked by the destroying insect. Should there be any on the plant at the time of the application of such elder extract, it will be found to have the effect of driving them immediately off, or should its application be made previously to the appearance of the bugs or worms, it will prevent their coming.

I have ascertained that the better time to apply such extract is just after the fall of rain, the moisture on the plant serving to keep the extract in active condition for a period quite equal to the lapse of time generally from one rainfall to another.

I am aware that the leaves of the elder, scattered over plants and vines, have been used to shield them from insects, and this I do not claim.

Having thus fully described my invention, what I claim as new, and desire to secure by Letters Patent, is—

The herein-described method of preserving vegetable life by the application of an extract for destroying animal insect life, the same consisting in sprinkling a compound of elder-juice and water reduced to the consistency of cream over and upon the plant while in a dampened or moistened state, substantially as specified.

In testimony whereof I affix my signature in presence of two witnesses.

JAMES COLE.

Witnesses:
    JNO. D. HILL,
    GEO. M. PRICE.